United States Patent
Li et al.

(10) Patent No.: US 11,732,337 B2
(45) Date of Patent: Aug. 22, 2023

(54) METHOD FOR PRODUCING HIGH NITROGEN STEEL BY DUPLEX MELTING PROCESS OF PRESSURIZED LADLE REFINING AND PRESSURIZED ELECTROSLAG REMELTING

(71) Applicant: NORTHEASTERN UNIVERSITY, Fushun (CN)

(72) Inventors: Huabing Li, Fushun (CN); Zhouhua Jiang, Fushun (CN); Hao Feng, Fushun (CN); Lingfeng Xia, Fushun (CN); Hongchun Zhu, Fushun (CN); Shucai Zhang, Fushun (CN); Weichao Jiao, Fushun (CN)

(73) Assignee: Northeastern University, Fushun (CN)

( * ) Notice: Subject to any disclaimer, the term of this patent is extended or adjusted under 35 U.S.C. 154(b) by 218 days.

(21) Appl. No.: 17/325,619

(22) Filed: May 20, 2021

(65) Prior Publication Data
US 2022/0228243 A1    Jul. 21, 2022

(30) Foreign Application Priority Data
Jan. 15, 2021    (CN) .......................... 202110055041.0

(51) Int. Cl.
C22C 38/00    (2006.01)
C21D 6/00    (2006.01)
C22B 9/18    (2006.01)
C21C 7/00    (2006.01)

(52) U.S. Cl.
CPC .......... *C22C 38/001* (2013.01); *C21C 7/0075* (2013.01); *C21D 6/002* (2013.01); *C21D 6/005* (2013.01); *C22B 9/18* (2013.01); *C21D 2211/001* (2013.01)

(58) Field of Classification Search
CPC ............ C21C 2007/0093; C21C 5/005; C21C 7/0006; C21C 7/0075; C21C 7/06; C21C 7/064; C21C 7/072; C21C 7/10; C21C 38/001; C21D 2211/001; C21D 6/002; C21D 6/005; C22B 9/18
See application file for complete search history.

(56) References Cited

FOREIGN PATENT DOCUMENTS

| CN | 101538636 A | * | 9/2009 | |
| CN | 105112609 A | * | 12/2015 | |
| CN | 106011371 A | * | 10/2016 | |
| CN | 106636858 A | * | 5/2017 | ............... C21C 7/06 |

* cited by examiner

*Primary Examiner* — Jenny R Wu
(74) *Attorney, Agent, or Firm* — Jeffrey D. Moy; Weiss & Moy, PC (57) ABSTRACT

The present disclosure provides a method for producing a high nitrogen steel by a duplex melting process of a pressurized ladle refining and a pressurized electroslag remelting, which relates to the technical field of high nitrogen steel melting. In the present disclosure, the molten steel is subjected in sequence to a nitrogen alloying, a deep deoxidation and a deep desulfurization by adding a nickel-magnesium alloy and rare earth in the pressurized ladle furnace, and a combination of a blowing nitrogen from the bottom of the pressurized ladle and a pressurized nitriding at the interface of gas and the molten steel is used to achieve a high-efficiency nitrogen alloying, a uniform nitrogen distribution, and a decreased impurity content in the ingot; then the ingot is subjected to a pressurized electroslag remelting to obtain a high nitrogen steel.

5 Claims, 2 Drawing Sheets pressurized ladle process    pressurized electroslag process

METHOD FOR PRODUCING HIGH NITROGEN STEEL BY DUPLEX MELTING PROCESS OF PRESSURIZED LADLE REFINING AND PRESSURIZED ELECTROSLAG REMELTING

CROSS REFERENCE TO RELATED APPLICATION

This patent application claims the benefit and priority of Chinese Patent Application No. 202110055041.0 filed on Jan. 15, 2021, the disclosure of which is incorporated by reference herein in its entirety as part of the present application.

TECHNICAL FIELD

The present disclosure relates to the technical field of high nitrogen steel melting, in particular to a method for producing a high nitrogen steel by a duplex melting process of a pressurized ladle refining and a pressurized electroslag remelting.

BACKGROUND ART

As an important alloying element in steel, nitrogen can greatly increase the strength of steel without significantly reducing its toughness through the combined effects of solid solution strengthening, fine grain strengthening, and precipitation strengthening. Through the synergistic effect of nitrogen and other alloying elements (Cr, Mo, etc.), the stability of passive film can be improved and the repassivation ability can be enhanced, thereby significantly improving the corrosion resistance of steel. The high nitrogen stainless steel is a kind of stainless steel with a nitrogen content exceeding the equilibrium solubility at atmospheric pressure, which has better mechanical properties and corrosion resistance than traditional stainless steel, and has been widely used in aviation, aerospace, petroleum, chemical, energy, marine and biological engineering and other fields.

The key to the preparation of the high nitrogen steel is to rapidly increase nitrogen content in the melt to a higher content during the melting, and to inhibit the severe segregation and pore precipitation of nitrogen during the solidification, that is, the addition and maintenance of nitrogen. Due to the low solubility of nitrogen in steel under atmospheric pressure, the pressurized metallurgy has become the main way to prepare the high nitrogen steel. At present, the method for preparing the high nitrogen steel by pressurized metallurgy comprises pressurized induction melting, large smelting bath method, and pressurized electroslag remelting. Among them, pressurized induction melting is easy to achieve nitrogen alloying and precise control of nitrogen content by adopting reasonable gas nitriding pressure and casting pressure. However, there is no slag on the surface of the molten steel during the pressurized induction melting, resulting in that the deoxidation and desulfurization products could not be completely removed, and that the cleanliness of the ingot needs to be further improved. In terms of compactness and segregation, the ingot produced by the pressurized induction melting also have obvious shortcomings compared with those produced by the pressurized electroslag remelting. In addition, due to the complexity of the large-scale induction melting system, the pressurized induction furnace only has a small tonnage and a limited gas-melt contact area, which results in a slow nitriding rate of molten steel and limits industrial production. Pressurized electroslag remelting adopting nitriding alloys for nitrogen alloying is currently the main method for commercial production of the high nitrogen stainless steel, which combines the technical benefits of electroslag remelting and pressurized enhanced cooling, and can inhibit the escape of nitrogen during the solidification of molten steel, thereby significantly improving the cleanliness of the steel and the compactness of the structure, and effectively promoting the refinement of the solidification structure. But this method has the following shortcomings: (1) the continuous addition of nitriding alloy under high pressure puts forward extremely high requirements on the measurement and control system; (2) the decomposition of the nitriding alloys added to the slag causes the slag pool to boil, which disturbs the remelting process, and it is easy to increase silicon content when using silicon nitride to increase nitrogen content; (3) in order to improve the uniformity of the composition of the ingot, it is often necessary to remelt twice or even three times.

Therefore, there is a need for a cost effective and convenient method for large scale industrial production of a high nitrogen steel to provide technical support for the preparation of a high nitrogen steel with high cleanliness, dense solidification structure and uniform nitrogen distribution.

SUMMARY

The purpose of the present disclosure is to provide a method for producing a high nitrogen steel by a duplex melting process of a pressurized ladle refining and a pressurized electroslag remelting. The method provided by the present disclosure makes it possible to realize a high-efficiency nitrogen alloying and a uniform nitrogen distribution. The prepared high nitrogen steel has low impurity content, high cleanliness, uniform and stable composition, and can meet the requirements of aviation, aerospace, petroleum, chemical, energy, marine and biological engineering and other fields.

In order to achieve the above mentioned purpose of the disclosure, the present disclosure provides the following technical solutions:

The disclosure provides a method for producing a high nitrogen steel by a duplex melting process of a pressurized ladle refining and a pressurized electroslag remelting, comprising the following steps:

(1) performing a nitrogen alloying on a molten steel in a pressurized ladle furnace to obtain a nitrogen-alloyed molten steel, then subjecting the nitrogen-alloyed molten steel to a deep deoxidation and a deep desulfurization, and finally casting, to obtain a high nitrogen steel ingot, wherein the nitrogen alloying comprises blowing nitrogen from the bottom of the pressurized ladle and nitriding at the interface of gas and the molten steel under pressure; the deep deoxidation and deep desulfurization are achieved by adding a nickel-magnesium alloy and rare earth to the molten steel at the end of the pressurized ladle refining; and (2) performing a pressurized electroslag remelting on the high nitrogen steel ingot obtained in step (1), to obtain a high nitrogen steel electroslag remelting ingo.

In some embodiments, the method further comprises in sequence preheating the pressurized ladle, pouring the molten steel into the preheated pressurized ladle and vacuuming, before the nitrogen alloying in step (1), wherein the preheating process can make the temperature of the pressurized ladle up to 1100° C. to 1200° C., and the vacuuming is performed so that a vacuum degree of less than 15 Pa is reached.

In some embodiments, the molten steel in step (1) is produced by a process of AOD (Argon-Oxygen Decarburization)+LF (Ladle Furnace), VOD (Vacuum Oxygen Decarburization)+LF or Converter+LF, with a temperature of 1620 to 1650° C., and has been subjected to a pre-deoxidation and pre-desulfurization.

In some embodiments, a gas nitriding pressure $p_1$ during the nitriding at the interface of gas and the molten steel in step (1) is calculated according to Formula I:

$$\lg[\%\,N] = \frac{1}{2}\lg(p_1/p^\theta) - \frac{188}{T} - 1.17 - \left\{\left(\frac{3280}{T} - 0.75\right)(0.13[\%\,N] + 0.118[\%\,C] + 0.043[\%\,Si] + 0.011[\%\,Ni] + 3.5\times 10^{-5}[\%\,Ni]^2 - 0.024[\%\,Mn] + 3.2\times 10^{-5}[\%\,Mn]^2 - 0.01[\%\,Mo] + 7.9\times 10^{-5}[\%\,Mo]^2 - 0.048[\%\,Cr] + 3.5\times 10^{-4}[\%\,Cr]^2\right) - 0.098[\%\,V] + 0.061\,g\sqrt{p_1/p^\theta}\right\}$$ Formula I in which $p_1$ represents the gas nitriding pressure in MPa; $p^\theta$ represents the standard atmospheric pressure, being 0.101325 MPa; and T represents the melting temperature in K.

In some embodiments, a bottom blowing pressure $p_2$ during blowing nitrogen from the bottom of the ladle in step (1) is calculated according to Formula II:

$$p_2 = 1.1(p_1 + \rho_{steel}gh + p_{loss})$$ Formula II in which $p_2$ represents the bottom blowing pressure in MPa; $p_1$ represents the gas nitriding pressure in MPa; $\rho_{steel}$ represents the density of the molten steel in kg/m³; g represents gravitational acceleration, which is 9.8 m/s²; h represents the depth of the molten steel in the ladle, in m; and $p_{loss}$ represents the pressure loss in pipelines and permeable bricks, which is in a range of 0.30 to 0.50 MPa.

In some embodiments, the high nitrogen steel is a high nitrogen stainless steel, and the high nitrogen stainless steel is a high nitrogen austenitic stainless steel or a high nitrogen martensitic stainless steel.

In some embodiments, under the condition that the high nitrogen steel is a high nitrogen austenitic stainless steel, the high nitrogen austenitic stainless steel comprises the following compositions in percentages by mass: C: 0.02-0.1%, Mn: 5-30%, Cr: 18-30%, Si: ≤1%, Mo: 0-6.0%, N: 0.2-1.2%, Ni: 0-25%, V: 0-1%, S: ≤0.015%, P: ≤0.05%, and the balance of Fe.

In some embodiments, under the condition that the high nitrogen steel is a high nitrogen austenitic stainless steel, a casting pressure $p_3$ in step (1) is calculated according to Formula III:

$$p_3 = [(0.30-0.40)p_1/p^\theta + (0.50-0.60)]$$ Formula III;

in which $p^\theta$ represents the standard atmospheric pressure; and a remelting pressure $p_4$ for the pressurized electroslag remelting in step (2) is calculated according to Formula IV:

$$p_4 = [p_3 + (0.30-0.40)]$$ Formula IV.

In some embodiments, under the condition that the high nitrogen steel is a high nitrogen martensitic stainless steel, the high nitrogen martensitic stainless steel comprises the following compositions in percentages by mass: C: 0.1-1.0%, Mn: 0.1-1%, Cr: 12-20%, Si: ≤1%, Mo: 0-3.0%, N: 0.1-0.6%, Ni: 0-4.5%, V: 0-2%, S: ≤0.015%, P: ≤0.05%, and the balance of Fe.

In some embodiments, under the condition that the high nitrogen steel is a high nitrogen martensitic stainless steel, a casting pressure $p_5$ in step (1) is calculated according to Formula V:

$$p_5 = [(0.15-0.20)p_1/p^\theta + (0.45-0.60)]$$ Formula V;

in which $p^\theta$ represents the standard atmospheric pressure; and a remelting pressure $p_6$ for the pressurized electroslag remelting in step (2) is calculated according to Formula VI:

$$p_6 = [p_5 + (0.30-0.40)]$$ Formula VI.

The present disclosure provides a method for producing a high nitrogen steel by a duplex melting process of a pressurized ladle refining and a pressurized electroslag remelting, comprising the following steps: (1) performing a nitrogen alloying on a molten steel in a pressurized ladle furnace to obtain a nitrogen-alloyed molten steel, then subjecting the nitrogen-alloyed molten steel to a deep deoxidation and a deep desulfurization, and finally casting, to obtain a high nitrogen steel ingot, wherein the nitrogen alloying comprises blowing nitrogen from the bottom of the pressurized ladle and nitriding at the interface of gas and the molten steel under pressure; the deep deoxidation and deep desulfurization are achieved by adding a nickel-magnesium alloy and rare earth to the molten steel at the end of the pressurized ladle refining; (2) performing a pressurized electroslag remelting on the high nitrogen steel ingot obtained in step (1), to obtain a high nitrogen steel electroslag remelting ingot. In the present disclosure, the molten steel is subjected in sequence to a nitrogen alloying, a deep deoxidation and a deep desulfurization in the pressurized ladle furnace, and a combination of a blowing nitrogen from the bottom of the ladle and a nitriding at the interface of gas and the molten steel under pressure is adopted to achieve a high-efficiency nitrogen alloying, a uniform nitrogen distribution, and a decreased impurity content in the ingot realized by adding the nickel-magnesium alloy and rare earth; then the nitrogen-alloyed ingot is subjected to a pressurized electroslag remelting to further decrease the content of inclusions and impurity elements in the molten steel and improve the segregation of steel, and to make the structure of the high nitrogen steel uniform and dense. The results of the Examples show that the high nitrogen steel prepared by the preparation method according to the present disclosure has a low impurity content and a uniform and stable composition.

DETAILED DESCRIPTION OF THE EMBODIMENTS

The disclosure provides a method for producing a high nitrogen steel by a duplex melting process of a pressurized ladle refining and a pressurized electroslag remelting, comprising the following steps:

(1) performing a nitrogen alloying on a molten steel in a pressurized ladle furnace to obtain a nitrogen-alloyed molten steel, then subjecting the nitrogen-alloyed molten steel to a deep deoxidation and a deep desulfurization, and finally casting, to obtain a high nitrogen steel ingot, wherein the nitrogen alloying comprises blowing nitrogen from the bottom of the pressurized ladle and nitriding at the interface of gas and the molten steel under pressure; the deep deoxidation and deep desulfurization are achieved by adding a nickel-magnesium alloy and rare earth to the molten steel at the end of the pressurized ladle refining; and (2) performing a pressurized electroslag remelting on the high nitrogen steel ingot obtained in step (1), to obtain a high nitrogen steel electroslag remelting ingot.

In some embodiments, the high nitrogen steel is a high nitrogen stainless steel; in some embodiments, the high nitrogen stainless steel is a high nitrogen austenitic stainless steel or a high nitrogen martensitic stainless steel.

In some embodiments, the high nitrogen austenitic stainless steel comprises the following compositions in percentages by mass: C: 0.02-0.1%, Mn: 5-30%, Cr: 18-30%, Si: ≤1%, Mo: 0-6.0%, N: 0.2-1.2%, Ni: 0-25%, V: 0-1%, S: ≤0.015, P: ≤0.05% and the balance of Fe; preferably, C: 0.04-0.08%, Mn: 13-20%, Cr: 18-24%, Si: 50.8%, Mo: 2.0-4.0%, N: 0.5-1.0%, Ni: 0-20%, V:0-0.2%, S: ≤0.010%, P: 50.04% and the balance of Fe. The chemical composition of the stainless steel is limited within the above range, which can ensure that the high nitrogen austenitic stainless steel has excellent mechanical properties and corrosion resistance.

In some embodiments, the high nitrogen martensitic stainless steel comprises the following compositions in percentages by mass: C: 0.1-1.0%, Mn: 0.1-1%, Cr: 12-20%, Si: 51%, Mo: 0-3.0%, N: 0.1-0.6%, Ni: 0-4.5%, V: 0-2%, S: ≤0.015%, P: ≤0.05% and the balance of Fe; preferably, C: 0.2-0.9%, Mn: 0.2-0.8%, Cr: 14-18%, Si: 51%, Mo: 0.5-2.5%, N: 0.2-0.5%, Ni: 0.5-2.0%, V: 0.1-1.0%, S: ≤0.010%, P: ≤0.04% and the balance of Fe. The chemical composition of the stainless steel is limited within the above range, which can ensure that the high nitrogen martensitic stainless steel has high strength, high hardness, excellent fatigue resistance and corrosion resistance.

In some embodiments of the present disclosure, the molten steel is subjected to a nitrogen alloying, a deep deoxidation and a deep desulfurization in sequence in the pressurized ladle furnace, and then is cast to obtain a high nitrogen steel ingot.

In the disclosure, the molten steel is first subjected to a nitrogen alloying in the pressurized ladle furnace to obtain a nitrogen-containing molten steel.

In some embodiments, the pressurized ladle is preheated, loaded with the molten steel and vacuumed in sequence before the nitrogen alloying. In some embodiments, the preheating process can make the temperature of the pressurized ladle up to 1100° C. to 1200° C., preferably 1150° C. to 1200° C. Preheating the pressurized ladle could reduce the temperature drop of the molten steel, and prevent the molten steel from solidifying due to excessive temperature drop in the pressurized ladle furnace.

In some embodiments, the temperature of the molten steel is 1620 to 1650° C., preferably 1630 to 1650° C. The temperature of the molten steel limited within the above range could keep the molten steel in the ladle furnace at a high temperature for a long time and prevent the molten steel from being solidified during the nitrogen alloying under circumstances that the temperature of the molten steel drops quickly during the pressurized ladle refining and nitriding; meanwhile, it could prevent the temperature of the molten steel from being too high to damage the refractory materials.

In some embodiments, the molten steel is produced by a process of AOD+LF, VOD+LF or Converter+LF, preferably produced by a process of VOD+LF or AOD+LF. The molten steel produced by the above processes in the present disclosure could not only increase the temperature of the molten steel to 1620 to 1650° C. by the process of LF, but also decrease the sulfur content of the molten steel and remove inclusions by a refining in the LF; meanwhile, it is convenient to connect the refining equipment with the pressurized ladles in series.

In some embodiments, vacuuming is performed so that a vacuum degree of less than 15 Pa is reached, preferably a vacuum degree of less than 10 Pa. In the disclosure, vacuuming the pressurized ladle furnace could decrease the oxygen content in the pressurized ladle furnace, thereby reducing the oxidation of the molten steel.

In some embodiments, the nitrogen alloying comprises blowing nitrogen from the bottom of the ladle and nitriding at the interface of gas and the molten steel under pressure. In some embodiments, the nitrogen alloying is performed for 15-20 min, preferably 15-18 min.

In some embodiments, the blowing nitrogen from the ladle bottom and the nitriding at the interface of gas and the molten steel under pressure are performed simultaneously.

In some embodiments, a gas nitriding pressure $p_1$ during the nitriding at the interface of gas and the molten steel is calculated according to Formula I:

$$\lg[\%N] = \frac{1}{2}\lg(p_1/p^\theta) - \frac{188}{T} - 1.17 - \\ \left\{\left(\frac{3280}{T} - 0.75\right)(0.13[\%N] + 0.118[\%C] + 0.043[\%Si] + \right. \\ 0.011[\%Ni] + 3.5 \times 10^{-5}[\%Ni]^2 - \\ 0.024[\%Mn] + 3.2 \times 10^{-5}[\%Mn]^2 - \\ 0.01[\%Mo] + 7.9 \times 10^{-5}[\%Mo]^2 - \\ 0.048[\%Cr] + 3.5 \times 10^{-4}[\%Cr]^2) - \\ \left. 0.098[\%V] + 0.061 \, g\sqrt{p_1/p^\theta}\right\},$$

Formula I in which $p_1$ represents the gas nitriding pressure in MPa; $p^\theta$ represents the standard atmospheric pressure, which is 0.101325 MPa; and T represents the melting temperature in K.

In some embodiments, a bottom blowing pressure $p_2$ during blowing nitrogen from the bottom of the pressurized ladle in step (1) is calculated according to Formula II:

$$p_2 = 1.1(p_1 + \rho_{steel}gh + p_{loss})$$

Formula II wherein $p_2$ represents the bottom blowing pressure in MPa; $p_1$ represents the gas nitriding pressure in MPa; $\rho_{steel}$ represents the density of molten steel in kg/m³; g represents gravitational acceleration, which is 9.8 m/s²; h represents the depth of molten steel in the ladle, in m; and $p_{loss}$ represents the pressure loss in pipelines and permeable bricks, which is in a range of 0.30 to 0.50 MPa.

In some embodiments, the nitrogen flow rate during blowing nitrogen from the bottom of the pressurized ladle is 150-300 NU/min, preferably 200-250 NL/min.

In some embodiments, the purity of the nitrogen is ≥99.999%. In the present disclosure, nitrogen with a high purity is used in the nitrogen alloying, thereby reducing the contamination to the molten steel by impurities in the nitrogen.

With the parameters of blowing nitrogen from the bottom of the pressurized ladle as well as those of the pressurized nitriding at the interface of gas and the liquid steel limited within the above ranges in the present disclosure, a high-efficiency nitrogen alloying and a uniform nitrogen distribution are realized by combining bottom blowing nitrogen and top pressurized nitriding.

After obtaining the nitrogen-containing molten steel, a deep deoxidation and a deep desulfurization are performed on the nitrogen-containing molten steel. In the present disclosure, the deep deoxidation and deep desulfurization are achieved by adding a nickel-magnesium alloy and rare earth to the molten steel at the end of the pressurized ladle refining. In some embodiments, a mass ratio of nickel to magnesium in the nickel-magnesium alloy is in a range of (7-9):(1-3), preferably (7.5-8):(2-2.5). In some embodiments, the nickel-magnesium alloy is used in an amount of 0.5-1.5 kg/t, preferably 0.8-1.2 kg/t, based on the mass of the molten steel being 1 t. In some embodiments, it is maintained for 2-3 minutes after adding the nickel-magnesium alloy. In the present disclosure, the nickel-magnesium alloy is used for deep deoxidation of the molten steel, and the time for the process is limited within the above range, making it possible to ensure that the content of oxygen in the molten steel after the deep deoxidation is low. In some embodiments, the rare earth is used in an amount of 0.3-0.7 kg/t, preferably 0.4-0.6 kg/t, based on the mass of the molten steel being 1 t. In some embodiments, it is maintained for 2-3 minutes after adding rare earth. In the present disclosure, the rare earth is used for deep deoxidation and deep desulfurization of the molten steel, and the time for the process is limited within the above range, making it possible to ensure that the content of oxygen and sulfur in the molten steel after the deep deoxidation and deep desulfurization meets the requirements.

In the present disclosure, there is no particular limitation to the type and source of the nickel-magnesium alloy and rare earth, and it is possible to use commercially available products well known to those skilled in the art.

In some embodiments of the present disclosure, blowing nitrogen from the bottom of the pressurized ladle is stopped after the deep deoxidation and deep desulfurization of the molten steel, the nitrogen pressure in the pressurized ladle furnace is raised to the casting pressure, and then the casting is performed, to obtain a high nitrogen steel ingot. In some embodiments, the casting temperature is in a range of 1500 to 1520° C.

In some embodiments, under the condition that the high nitrogen steel is a high nitrogen austenitic stainless steel, a casting pressure $p_3$ is calculated according to Formula III:

$$p_3=[(0.30-0.40)p_1/p^\theta+(0.50-0.60)]$$ Formula III.

In some embodiments, under the condition that the high nitrogen steel is a high nitrogen martensitic stainless steel, a casting pressure $p_5$ is calculated according to Formula V:

$$p_5=[(0.15-0.20)p_1/p^\theta+(0.45-0.60)]$$ Formula V.

In some embodiments, the high nitrogen steel ingot can be taken out after the molten steel is solidified and the pressurized ladle furnace is decompressed. The above processes according to the present disclosure makes it possible to prepare a high nitrogen steel ingot, and could ensure that the components in the prepared high nitrogen steel ingots are uniform and that the impurity content is low.

After obtaining the high nitrogen steel ingot, the high nitrogen steel ingot is subjected to a pressurized electroslag remelting, to obtain the high nitrogen steel electroslag remelting ingot.

In some embodiments, the pressurized electroslag remelting comprises the following steps:

1) heating and forging the high nitrogen steel ingot in sequence to obtain a consumable electrode;

) 2) drying a pre-melted slag to obtain a dried pre-melted slag;

) 3) installing the consumable electrode obtained in step 1), the dried pre-melted slag obtained in step 2) and arc striking steel cuttings into a pressurized electroslag remelting furnace;

4) vacuuming and boosting the pressurized electroslag remelting furnace in step 3) in sequence, to obtain a treated pressurized electroslag remelting furnace;

5) subjecting the treated pressurized electroslag remelting furnace obtained in step 4) in sequence to an arc striking slagging, a pressurized electroslag remelting, and a post-remelting feeding in sequence, to obtain a high nitrogen steel electroslag remelting ingot;

step 1) and step 2) are performed in any order.

There is no particular limitation to the source of the pressurized electroslag remelting furnace, and commercially available products well known to those skilled in the art can be used.

In some embodiments, the high nitrogen steel ingot is heated and forged in sequence to obtain a consumable electrode. In some embodiments, the heating is performed at a temperature of 1150 to 1200° C. for 3 to 5 hours, preferably 1160 to 1190° C., preferably 4-5 hours. In some embodiments, the forging is performed immediately after heating. In the present disclosure, there is no special limitation to the heating rate with which the temperature is raised to the heating temperature, and the heating rate could be determined according to the technical common sense of those skilled in the art. Also, there is no special limitation to the specific forging operation which could be determined so that the consumable electrode of high nitrogen steel is forged to have a size suitable for the pressurized electroslag remelting crystallizer.

After the consumable electrode is obtained, in some embodiments, the consumable electrode is polished around. In the present disclosure, there is no special limitation to the specific polishing operation which could be determined according to the conventional polishing operation in the art. The consumable electrode is polished around, thereby removing oxide scale, and preventing the increase of oxygen content in the electroslag remelting ingot.

In some embodiments, the pre-melted slag is dried to obtain a dried pre-melted slag. In some embodiments, the pre-melted slag is $CaF_2$—$CaO$—$Al_2O_3$; the mass ratio of $CaF_2$, $CaO$ and $Al_2O_3$ in the pre-melted slag is in a range of (50-70):(15-25):(15-25).

In some embodiments, the drying is performed at a temperature of 600 to 800° C., preferably 650 to 750° C.; in some embodiments, the drying is performed for 5-7 hours, preferably for 6 to 7 hours. By drying the pre-melted slag, the moisture in the pre-melted slag could be removed, which thus prevents the electroslag remelting ingot from increasing hydrogen.

In some embodiments, the consumable electrode, the dried pre-melted slag and the arc striking steel cuttings are installed into a pressurized electroslag remelting furnace. In some embodiments, the arc striking steel cuttings are made of a material which is the same as the consumable electrode.

In the present disclosure, the consumable electrode is welded to the dummy electrode, connected to the electrode holder of the pressurized electroslag remelting furnace, and the dummy plate is placed on the bottom water-cooled base plate which is then raised, and the arc striking steel cuttings are added, and the pre-melted slag is laid around, the electrode is lowered to the required position for slagging, and the consumable electrode, the arc striking steel cuttings and the bottom water-cooled base plate are in close contact. In the present disclosure, the consumable electrode, the dried pre-melted slag, and the arc striking steel cuttings are installed in the above mentioned manner, which can ensure that the current flows through them after power on.

After the installation, in some embodiments, the pressurized electroslag remelting furnace is sealed, which could prevent external air from entering the pressurized electroslag remelting furnace.

In some embodiments, the pressurized electroslag remelting furnace is vacuumed and inflated in sequence, to obtain a treated pressurized electroslag remelting furnace. In some embodiments, the vacuuming is performed so that a vacuum degree of less than 15 Pa is reached, preferably a vacuum degree of less than 10 Pa. In some embodiments, the gas charged is nitrogen, and the purity of the nitrogen is ≥99.999%; in some embodiments, the pressure after the inflating is normal pressure. In the present disclosure, air in the pressurized electroslag remelting furnace could be removed by vacuuming and inflating the pressurized electroslag remelting furnace, thereby preventing the oxidation of the ingot and the introduction of impurities during the pressurized electroslag remelting.

In some embodiments, the device used for vacuuming is a vacuum pump. There is no particular limitation to the source of the vacuum pump, and commercially available products well known to those skilled in the art can be used.

In some embodiments, the treated pressurized electroslag remelting furnace is subjected in sequence to an arc slagging, a pressurized electroslag remelting and a post-remelting feeding, to obtain the high nitrogen steel electroslag remelting ingot.

In some embodiments, the arc striking slagging is performed at a voltage of 40 to 70 V, preferably 50 to 60 V and a current of 10 to 12 kA for 40 to 50 min. In the present disclosure, the parameters of arc striking slagging limited within the above range make it possible to melt the arc striking steel cuttings first and gradually surrounding slag by resistance heat, and to complete the slagging.

After the arc striking slagging, in some embodiments, the melting chamber of the pressurized electroslag remelting furnace is charged with nitrogen to increase the pressure to the remelting pressure. In some embodiments, the remelting pressure for pressurized electroslag remelting is related to the type of the high nitrogen steel. In the present disclosure, under the condition that the high nitrogen steel is a high nitrogen austenitic stainless steel, the remelting pressure $p_4$ for the pressurized electroslag remelting is calculated according to Formula IV:

$$p_4=[p_3+(0.30-0.40)] \qquad \text{Formula IV;}$$

under the condition that the high nitrogen steel is a high nitrogen martensitic stainless steel, the remelting pressure $p_6$ for the pressurized electroslag remelting is calculated according to Formula V:

$$p_6=[p_5+(0.30-0.40)] \qquad \text{Formula VI.}$$

While increasing the pressure in the melting chamber of the pressurized electroslag remelting furnace, in some embodiments, the pressure of the cooling water in the jacket of the crystallizer of the pressurized electroslag remelting furnace is raised to the remelting pressure of the pressurized electroslag remelting. In the present disclosure, the remelting pressure of the pressurized electroslag remelting and the cooling water pressure in the jacket of the crystallizer of the pressurized electroslag remelting furnace limited within the above range make it possible to avoid the escaping from nitrogen holes and proceed the pressurized electroslag remelting normally.

In some embodiments, the pressurized electroslag remelting is performed at a voltage of 70 to 80 V, preferably 72 to 78 V; in some embodiments, the pressurized electroslag remelting is performed at a current of 17 to 22 kA, preferably 19 to 21 kA; in some embodiments, the pressurized electroslag remelting is performed at a melting rate of 0.75 to 0.80 t/h, preferably 0.76 to 0.79 t/h; in some embodiments, the pressurized electroslag remelting is performed at a current fluctuation of less than ±3%, preferably less than ±2.5%; in some embodiments, the pressurized electroslag remelting is performed at a voltage fluctuation of less than ±0.5%, preferably less than ±0.4%; in some embodiments, the pressurized electroslag remelting is performed at a melting rate fluctuation of less than 10%, preferably less than 8%. In the present disclosure, the parameters of the pressurized electroslag remelting are limited within the above range, and thus enable the high nitrogen stainless steel ingot to have a good surface quality, low sulfur content, few non-metallic inclusions, and a uniform structure and chemical composition.

In some embodiments, the post-remelting feeding is performed at a voltage of 50 to 60 V, preferably 53 to 57 V. In some embodiments, the post-remelting feeding is performed with a stepped down current; in some embodiments, the post-remelting feeding is performed with an initial current of 10 to 11 kA; in some embodiments, the stepped down current is achieved by reducing by 0.8 to 1.2 kA for each step; in some embodiments, the current is stepwise reduced with 6 to 9 steps, preferably 7 to 8 steps; in some embodiments, the current is kept constant for 5 to 7 min after each reduction, and after the last reduction, the current is kept constant for 25 to 40 min, then the electrode is lifted. In some embodiments of the present disclosure, the post-remelting feeding is performed for 1.3 to 1.7 hours in total. In the present disclosure, the above mentioned post-remelting feeding process enables sufficient feeding, smooth end surface after feeding, and higher metallic yielding rate.

After the feeding, the alternating current power supply is switched off. After the high nitrogen steel electroslag remelting ingot is solidified, the nitrogen pressure in the melting chamber is gradually reduced to normal pressure, and the cooling water pressure in the jacket of the crystallizer is simultaneously reduced, and then the high nitrogen stainless steel electroslag remelting ingot is taken out. In the present disclosure, under the condition that the high nitrogen steel is a high nitrogen martensitic stainless steel, the ingot should be taken out in time after the melting, then thermally sent to an insulation cover to cool slowly, to prevent cracking. In the present disclosure, the above processes make it possible to greatly reduce the cracking during the cooling of the high nitrogen martensitic stainless steel.

In the method for producing a high nitrogen steel by a duplex process of a pressurized ladle refining and a pressurized electroslag remelting provided in the present disclosure, the pressurized ladle refining has the following benefits:

(1) raw materials fed into the pressurized ladle are widely available, such as a molten steel obtained by a refining process of AOD+LF, VOD+LF or Converter+LF;

(2) the pressurized ladle furnace and the refining equipment outside are flexibly connected in series, with a low investment cost and a larger tonnage, which is convenient for industrial production;

(3) the pressurized ladle refining is high in production efficiency, this is because the pressurized ladle furnace adopts the combination of the blowing nitrogen from the bottom of the pressurized ladle and the nitriding at the interface of gas and the molten steel under pressure, which can greatly increase the nitriding rate and enable a high production efficiency;

(4) the blowing nitrogen from the bottom for the pressurized ladle can help to fully stir the molten steel, improve the uniformity of temperature and composition, and promote the floating of inclusions;

(5) during blowing nitrogen from the bottom for the pressurized ladle, the temperature of the molten steel gradually decreases, so that the solubility of nitrogen in the molten steel gradually increases, which is beneficial to the increase of the nitrogen content;

(6) the nitriding with high purity nitrogen in the pressurized ladle furnace, without adding nitriding alloys, enables no pollution in molten steel, and a high cleanliness; the pressurized casting makes it possible to effectively promote the refinement of the solidification structure, improve the compactness of the structure, and reduce segregation.

In the method for producing a high nitrogen steel by a duplex process of a pressurized ladle refining and a pressurized electroslag remelting as provided in the present disclosure, the pressurized electroslag remelting has the following benefits:

(1) the electroslag remelting is performed under pressure, and thus the escape of nitrogen during the melting could be avoided;

(2) since the nitrogen alloying has been completed in the pressurized ladle refining, there is no need for adding nitriding alloy during the pressurized electroslag remelting, which could avoid problems such as slag pool boiling, uneven nitrogen distribution, and increased silicon content; in addition, the pressurized electroslag remelting does not require excessive pressure, which has a reduced equipment burden and could be proceed at a lower pressure and could extend the life of the equipment;

(3) during the pressurized electroslag remelting, pressurized enhanced cooling makes it possible to refine the solidification structure and improve the segregation of the components of the electroslag remelting ingots;

(4) as the molten steel, obtained by melting the consumable electrode from its end to the whole, drop through the slag pool, a sufficient slag refining occurs. The consumable electrode contacts with the high-temperature molten slag directly, with a large reaction interface, which is beneficial to improve the cleanliness of molten steel;

(5) during the pressurized electroslag remelting, the molten steel pool has a high temperature in center with the molten slag and molten steel both overheated, creating a superior reaction kinetics conditions, which is conducive for the slag pool to absorb the inclusions and impurity elements in the molten steel, compensating insufficient removal of inclusions and impurity elements during the pressurized ladle refining;

(6) because the smelting bath is heated by the upper slag pool and the molten droplets, as well as the downward and horizontal heat dissipation of the water-cooled crystallizer, the high nitrogen steel always solidifies in a bottom-up order and crystallizes directionally, and has good axiality, which could improve the hot workability of steel and make the internal structure of the electroslag remelting ingot uniform and compact.

In the preparation method provided by the present disclosure, the nitrogen alloying is performed by a combination of blowing nitrogen from the ladle bottom and nitriding at the interface of gas and the molten steel under pressure, which enables a high efficiency and a uniform nitrogen distribution, then the pressurized electroslag remelting is performed to further remove the inclusions and impurity elements in the molten steel, compensate the insufficient removal of inclusions and impurity elements during the pressurized ladle refining, improve the hot workability of the steel, and make the internal structure of the high nitrogen steel uniform and compact. The preparation method is simple and suitable for industrial mass production.

The molten steel produced by a process of AOD+LF, VOD+LF or Converter+LF is used as raw materials in the present disclosure, then is subjected to a blowing nitrogen from the ladle bottom and a nitriding at the interface of gas and the molten steel under pressure in the pressurized ladle furnace to prepare a consumable electrode base material with target nitrogen content, and the consumable electrode base material is forged to obtain a consumable electrode with a size suitable for the pressurized electroslag remelting; then during the pressurized electroslag remelting, impurity elements and inclusions in steel are effectively removed, so the high nitrogen steel electroslag remelting ingots with high cleanliness and dense structure are produced.

The present disclosure addresses the problem of rapid temperature drop and solidification of molten steel in the pressurized ladle furnace during the nitrogen alloying of the pressurized ladle refining by the following processes:

(1) preheating the ladle by a ladle roaster: before adding the molten steel from the LF, the ladle is preheated to 1100° C. to 1200° C. by a ladle roaster, to reduce the temperature drop of the molten steel;

(2) raising the temperature of the molten steel to be added to the pressurized ladle: the molten steel to be added to the pressurized ladle in the present disclosure need to be refined in the LF. On the one hand, the temperature of the molten steel is increased to 1620 to 1650° C. in the LF, and on the other hand, the refining in the LF makes it possible to reduce the sulfur content of molten steel and remove inclusions;

(3) improving the efficiency of nitriding and shortening nitriding time: the combination of blowing nitrogen from the bottom of the pressurized ladle and nitriding at the interface of gas and the molten steel under pressure enable a faster rate of nitriding, shorter nitriding time and lower temperature drop.

The disclosure addresses the problem of difficult in the precise control of nitrogen content in the pressurized ladle refining, and the problem of difficult in the control of the bottom blowing under pressure process by the following processes:

(1) controlling the nitrogen pressure during the nitrogen alloying and the casting: during nitrogen alloying, the nitrogen pressure is gradually raised in the pressurized ladle furnace to the gas nitriding pressure, while the nitrogen pressure and flow rate of the bottom blowing process is controlled to achieve high-efficiency nitrogen alloying and uniform nitrogen distribution; before the casting, the blowing nitrogen from the ladle bottom is stopped, and the pressure in the furnace is raised to the casting pressure, and the nitrogen content is increased while avoiding the escape of nitrogen during the solidification. By reasonably matching the pressurized gas nitriding pressure, bottom blowing pressure and casting pressure, precise control of nitrogen content in the pressurized ladle refining process could be realized;

(2) monitoring of the pressure in the pressurized ladle furnace in real time: with the gas control system, the bottom blowing nitrogen pressure is controlled online to avoid the splashing of molten steel caused by an excessive bottom blowing pressure, or the failure of bottom blowing due to a lower bottom blowing pressure.

The technical solutions of the present disclosure will be clearly and completely described below in conjunction with the embodiments of the present disclosure. Obviously, the described embodiments are only a part of the embodiments of the present disclosure, rather than all the embodiments. Based on the embodiments of the present disclosure, all other embodiments obtained by those skilled in the art without creative labor shall fall within the protection scope of the present disclosure.

Example 1

The melting equipments used were an 80 t pressurized ladle refining furnace and a 20 t pressurized electroslag remelting furnace, of which the pressurized ladle refining furnace has a ultimate vacuum of 8 Pa, a maximum pressure of 7 MPa, and a ladle charging amount of 75 to 80 t; the pressurized electroslag remelting furnace has a maximum pressure of 5 MPa, a crystallizer with an inner diameter D of 950 mm, and a consumable electrode with a weight of about 15 t.

According to Formula I, Formula II, Formula V and Formula VI, the gas nitriding pressure $p_1$ was calculated as 0.40 MPa, the bottom blowing pressure $p_2$ was calculated as 1.02 MPa, the casting pressure $p_5$ was calculated as 1.10 MPa, and the pressurized electroslag remelting pressure $p_6$ was calculated as 1.50 MPa. Raw materials for the melting and the mass thereof were as follows: 80.11 t of a molten steel from AOD+LF, 80.30 kg of a nickel-magnesium alloy (80Ni-20Mg) and 40.13 kg of cerium.

The molten steel consisted of the following compositions in percentages by mass: C: 0.33%, Mn: 0.42%, Cr: 15.50%, Si: 0.52%, Mo: 1.03%, S: 0.015%, P: 0.008%, and the balance of Fe.

The high nitrogen martensitic stainless steel 30Cr15Mo1N consisted of the following target compositions in percentages by mass: C: 0.32%, Mn: 0.40%, Cr: 15.30%, Si: 0.50%, Mo: 1.0%, N: 0.40%, S: ≤0.01%, P: ≤0.03%, and the balance of Fe.

(1) The pressurized ladle was preheated to 1150° C., and the molten steel with a temperature of 1630° C. was added to the pressurized ladle, then the pressurized ladle furnace was vacuumed to a vacuum degree of 12.2 Pa by a vacuum pump. The ladle furnace was charged with high-purity nitrogen with a purity of 99.999% until the gas nitriding pressure was 0.40 MPa, and at the same time, the high-purity nitrogen was blown with a pressure of 1.02 MPa and at a flow rate of 200 NL/min through the permeable bricks at the bottom of the ladle for 15 minutes for nitrogen alloying. Then the feeding valve was opened and the nickel-magnesium alloy was added into the molten steel with a feeding hopper, kept stand for 2 min and then cerium was added and kept stand for 3 min, then the blowing nitrogen was stopped. After stopping the blowing nitrogen, the ladle was charged with a high-purity nitrogen with a purity of 99.999% until the pressure reached 1.10 MPa, then the molten steel was cast into an ingot mold with a casting temperature of 1520° C., and the pressure was released after solidification, obtaining a high nitrogen martensitic stainless steel ingot.

The composition of the high nitrogen martensitic stainless steel ingot was shown in Table 1.

TABLE 1

The composition of the high nitrogen martensitic stainless steel ingot as prepared in Example 1

| Composition | C | Si | Mn | Cr | Mo | N | S | P | Fe |
|---|---|---|---|---|---|---|---|---|---|
| Content | 0.31 | 0.39 | 0.37 | 15.10 | 0.96 | 0.38 | 0.0031 | 0.008 | balance |

(2) The high nitrogen martensitic stainless steel ingot obtained in step (1) was subjected to a pressurized electroslag remelting, obtaining a high nitrogen steel electroslag remelting ingot.

The pressurized electroslag remelting was performed according to the following procedure:

1) The high nitrogen martensitic stainless steel ingot was kept at a temperature of 1200° C. for 3 hours, and forged into a consumable electrode with a diameter of 833 mm. The consumable electrode was then polished around.

2) Before the pressurized electroslag remelting, 342 kg of the pre-melted slag consisting of, in percentages by mass, $CaF_2$ of 65%, CaO of 20%, and $Al_2O_3$ of 15%, was put into a resistance furnace, and baked at a temperature of 800° C. for 6 hours, obtaining a dried pre-melted slag.

3) The consumable electrode obtained in step 1) was welded to the dummy electrode and connected to the electrode holder of the pressurized electroslag remelting furnace. The crystallizer and bottom water-cooled base plate were checked carefully to ensure that there was no water leakage. After cleaning the bottom water-cooled base plate, the dummy plate was placed on the bottom water-cooled base plate, which was then raised. The arc striking steel cuttings made of the same material as the consumable electrode was added, and the pre-melted slag was laid around. The electrode was lowered to the required position for slagging, and the consumable electrode, the arc striking steel cuttings and the bottom water-cooled base plate were in close contact to ensure that the current flows through them after power on. The pressurized electroslag remelting furnace was sealed.

4) The pressurized electroslag remelting furnace in step 3) was vacuumed to a vacuum degree of 12.1 Pa by a vacuum pump, and then the melting chamber was charged with nitrogen with a purity of ≥99.999% to normal pressure, obtaining a treated pressurized electroslag remelting furnace.

5) The alternating current power supply was switched on, with a current of 10 kA and a voltage of 50 V; at the same time, the pre-melted slag was added to the crystallizer in batches with a stepping feeder for arc striking slagging, and then the arc slagging was performed for 40 minutes. After the arc striking slagging, the melting chamber was charged with nitrogen with a purity of ≥99.999% until the pressure reached 1.50 MPa, synchronously the pressure of the cooling water in the jacket of the crystallizer in the electroslag remelting furnace was raised to 1.50 MPa, the voltage was adjusted to 80 V and the current was adjusted to 18 kA, and then the pressurized electroslag remelting was started with a melting rate of 0.76 t/h. The melting was performed with a current fluctuation of less than 3%, a voltage fluctuation of less than: 0.5%, and a melting rate fluctuation of less than 10%. Then the voltage was adjusted to 60 V, and the current was adjusted to 11 kA, and the feeding was started, during which the voltage was kept constant, and the current was stepwise reduced. The current was reduced by 1.0 kA for each reduction, and kept constant for 6 min after each reduction, and when it was reduced to 1.0 kA, the current was kept constant for 30 min. After the feeding, the electrode was lifted and powered off. The alternating current power supply was switched off. After the high nitrogen martensitic stainless steel electroslag remelting ingot was solidified, the nitrogen pressure was gradually reduced in the crystallizer, and simultaneously the pressure of the cooling water in the jacket of crystallizer was reduced, then a high nitrogen martensitic stainless steel electroslag remelting ingot was obtained which was thermally sent to an insulation cover to cool slowly to prevent cracking.

The composition of the high nitrogen martensitic stainless steel electroslag remelting ingot was shown in Table 2.

TABLE 2

Composition of high nitrogen martensitic stainless steel electroslag remelting ingot as prepared in Example 1

| Composition | C | Si | Mn | Cr | Mo | N | S | P | Fe |
|---|---|---|---|---|---|---|---|---|---|
| Content | 0.31 | 0.38 | 0.36 | 14.98 | 0.96 | 0.39 | 0.0012 | 0.007 | balance |

It can be seen from Table 1 and Table 2 that after the pressurized electroslag remelting, the high nitrogen martensitic stainless steel electroslag remelting ingot obtained in Example 1 had significantly reduced sulfur content, and substantially unchanged contents of the other compositions.

Example 2

The melting equipment used was an 80 t pressurized ladle refining furnace and a 20 t pressurized electroslag remelting furnace, of which the pressurized ladle refining furnace has a ultimate vacuum of 8 Pa, a maximum pressure of 7 MPa, and a ladle charging amount of 75 to 80 t; the pressurized electroslag remelting furnace has a maximum pressure of 5 MPa, a crystallizer with an inner diameter D of 950 mm, and a consumable electrode with a weight of about 15 t.

According to Formula I, Formula II, Formula V and Formula VI, the gas nitriding pressure $p_1$ was calculated as 0.10 MPa, the bottom blowing pressure $p_2$ was calculated as 0.70 MPa, the casting pressure $p_5$ was calculated as 0.80 MPa, and the pressurized electroslag remelting pressure $p_6$ was calculated as 1.50 MPa. Raw materials for the melting and the mass thereof were as follows: 80.12 t of a molten steel from AOD+LF, 80.20 kg of nickel-magnesium alloy (80Ni-20Mg) and 40.10 kg of cerium.

The molten steel consisted of the following composition in percentages by mass: C: 0.55%, Mn: 0.42%, Cr: 17.41%, Si: 0.46%, Mo: 1.13%, V: 0.11%, S: 0.020%, P: 0.008%, and the balance of Fe.

The high nitrogen martensitic stainless steel 55Cr18Mo1VN consisted of the following target compositions in percentages by mass: C: 0.54%, Mn: 0.40%, Cr: 17.30%, Si: 0.45%, Mo: 1.10%, V: 0.10%, N: 0.20%, S: 0.01%, P: ≤0.03%, and the balance of Fe.

(1) The pressurized ladle was preheated to 1150° C., and the molten steel with a temperature of 1625° C. was added to the pressurized ladle, then the pressurized ladle furnace was vacuumed to a vacuum degree of 12.3 Pa by a vacuum pump. The ladle furnace was charged with high-purity nitrogen with a purity of ≥99.999% until the gas nitriding pressure was 0.10 MPa, and at the same time, the high-purity nitrogen was blown with a pressure of 0.70 MPa and at a flow rate of 160 NL/min through the permeable bricks at the bottom of the ladle for 16 minutes for nitrogen alloying. Then the feeding valve was opened and the nickel-magnesium alloy was added into the molten steel with a feeding hopper, kept stand for 3 min and then cerium was added and kept stand for 3 min, then the blowing nitrogen was stopped. After stopping the blowing nitrogen, the ladle was charged with a high-purity nitrogen with a purity of ≥99.999% until the pressure reached 0.80 MPa, then the molten steel was cast into an ingot mold with a casting temperature of 1515° C., and the pressure was released after solidification, obtaining a high nitrogen martensitic stainless steel ingot.

The composition of the high nitrogen martensitic stainless steel ingot was shown in Table 3.

TABLE 3

The composition of the high nitrogen martensitic stainless steel ingot as prepared in Example 2

| Composition | C | Si | Mn | Cr | Mo | V | N | S | P | Fe |
|---|---|---|---|---|---|---|---|---|---|---|
| Content | 0.53 | 0.41 | 0.38 | 17.00 | 0.98 | 0.10 | 0.22 | 0.0028 | 0.007 | balance |

(2) The high nitrogen martensitic stainless steel ingot obtained in step (1) was subjected to a pressurized electroslag remelting, obtaining a high nitrogen steel electroslag remelting ingot.

The pressurized electroslag remelting was performed according to the following procedure:

1) The high nitrogen martensitic stainless steel ingot was kept at a temperature of 1200° C. for 3 hours, and forged into a consumable electrode with a diameter of 842 mm. The consumable electrode was then polished around.

2) Before the pressurized electroslag remelting, 342 kg of the pro-melted slag consisting of, in percentages by mass, $CaF_2$ of 63%, CaO of 21%, and $Al_2O_3$ of 16%, was put into a resistance furnace, and baked at a temperature of 800° C. for 6 hours, obtaining a dried pre-melted slag.

3) The consumable electrode obtained in step 1) was welded to the dummy electrode and connected to the electrode holder of the pressurized electroslag remelting furnace. The crystallizer and bottom water-cooled base plate were checked carefully to ensure that there was no water leakage. After cleaning the bottom water-cooled base plate, the dummy plate was placed on the bottom water-cooled base plate, which was then raised. The arc striking steel cuttings made of the same material as the consumable electrode was added, and the pre-melted slag was laid around. The electrode was lowered to the required position for slagging, and the consumable electrode, the arc striking steel cuttings and the bottom water-cooled base plate were in close contact to ensure that the current flows through them after power on. The pressurized electroslag remelting furnace was sealed.

4) The pressurized electroslag remelting furnace in step 3) was vacuumed to a vacuum degree of 12.0 Pa by a vacuum pump, and then the melting chamber was charged with nitrogen with a purity of ≥99.999% to normal pressure, obtaining a treated pressurized electroslag remelting furnace.

5) The alternating current power supply was switched on, with a current of 10 kA and a voltage of 50 V; at the same time, the pre-melted slag was added to the crystallizer in batches with a stepping feeder for arc striking slagging, and then the arc slagging was performed for 40 minutes. After the arc striking slagging, the melting chamber was charged with nitrogen with a purity of ≥99.999% until the pressure reached 1.50 MPa, synchronously the pressure of the cooling water in the jacket of the crystallizer in the electroslag remelting furnace was raised to 1.50 MPa, the voltage was adjusted to 80 V and the current was adjusted to 18 kA, and then the pressurized electroslag remelting was started with a melting rate of 0.76 t/h. The melting was performed with a current fluctuation of less than 3%, a voltage fluctuation of less than ±0.5%, and a melting rate fluctuation of less than 10%. Then the voltage was adjusted to 60 V, and the current was adjusted to 11 kA, and the feeding was started, during which the voltage was kept constant, and the current was stepwise reduced. The current was reduced by 1.0 kA for each reduction, and kept constant for 6 min after each reduction, and when it was reduced to 1.0 kA, the current was kept constant for 30 min. After the feeding, the electrode was lifted and powered off. The alternating current power supply was switched off. After the high nitrogen martensitic stainless steel electroslag remelting ingot was solidified, the nitrogen pressure was gradually reduced in the crystallizer, and simultaneously the pressure of the cooling water in the jacket of crystallizer was reduced, then a high nitrogen martensitic stainless steel electroslag remelting ingot was obtained which was thermally sent to an insulation cover to cool slowly to prevent cracking.

The composition of the high nitrogen martensitic stainless steel electroslag remelting ingot was shown in Table 4.

TABLE 4

| Composition of high nitrogen martensitic stainless steel electroslag remelting ingot as prepared in Example 2 | | | | | | | | | |
|---|---|---|---|---|---|---|---|---|---|
| Composition | C | Si | Mn | Cr | Mo | V | N | S | P | Fe |
| Content | 0.53 | 0.40 | 0.37 | 16.90 | 0.97 | 0.10 | 0.23 | 0.0010 | 0.007 | balance |

It can be seen from Table 3 and Table 4 that after the pressurized electroslag remelting, the high nitrogen martensitic stainless steel electroslag remelting ingot obtained in Example 2 had significantly reduced sulfur content, and substantially unchanged contents of the other compositions.

Example 3

The melting equipment used was an 80 t pressurized ladle refining furnace and a 20 t pressurized electroslag remelting furnace, of which the pressurized ladle refining furnace has a ultimate vacuum of 8 Pa, a maximum pressure of 7 MPa, and a ladle charging amount of 75 to 80 t; the pressurized electroslag remelting furnace has a maximum pressure of 5 MPa, a crystallizer with an inner diameter D of 950 mm, and a consumable electrode with a weight of about 15 t.

According to Formula I, Formula II, Formula III and Formula IV, the gas nitriding pressure $p_1$ was calculated as 0.15 MPa, the bottom blowing pressure $p_2$ was calculated as 0.75 MPa, the casting pressure $p_3$ was calculated as 1.20 MPa, and the pressurized electroslag remelting pressure $p_4$ was calculated as 1.60 MPa. Raw materials for the melting and the mass thereof were as follows: 80.20 t of a molten steel from AOD+LF, 80.23 kg of nickel-magnesium alloy (80Ni-20Mg) and 40.11 kg of cerium.

The molten steel consisted of the following composition in percentages by mass: C: 0.06%, Mn: 18.65%, Cr: 18.10%, Mo: 2.12%, S: 0.018%, P: 0.008%, and the balance of Fe.

The high nitrogen austenitic stainless steel 18Cr18Mn2Mo0.9N consisted of the following target compositions in percentages by mass: C: 0.04%, Mn: 18.60%, Cr: 17.94%, Mo: 2.09%, N: 0.89%, S: 50.01%, P: 50.03%, and the balance of Fe.

(1) The pressurized ladle was preheated to 1150° C., and the molten steel with a temperature of 1620° C. was added to the pressurized ladle, then the pressurized ladle furnace was vacuumed to a vacuum degree of 12.6 Pa by a vacuum pump. The ladle furnace was charged with high-purity nitrogen with a purity of ≥99.999% until the gas nitriding pressure was 0.15 MPa, and at the same time, the high-purity nitrogen was blown with a pressure of 0.75 MPa and at a flow rate of 150 NL/min through the permeable bricks at the bottom of the ladle for 20 minutes for nitrogen alloying. Then the feeding valve was opened and the nickel-magnesium alloy was added into the molten steel with a feeding hopper, kept stand for 2 min and then cerium was added and kept stand for 2 min, then the blowing nitrogen was stopped. After stopping the blowing nitrogen, the ladle was charged with a high-purity nitrogen with a purity of ≥99.999% until the pressure reached 1.20 MPa, then the molten steel was cast into an ingot mold with a casting temperature of 1515° C., and the pressure was released after solidification, obtaining a high nitrogen austenitic stainless steel ingot.

The composition of the high nitrogen austenitic stainless steel ingot was shown in Table 5.

(2) The high nitrogen austenitic stainless steel ingot obtained in step (1) was subjected to a pressurized electroslag remelting, obtaining a high nitrogen steel electroslag remelting ingot.

The pressurized electroslag remelting was performed according to the following procedure:

1) The high nitrogen austenitic stainless steel ingot was kept at a temperature of 1200° C. for 3 hours, and forged into a consumable electrode with a diameter of 838 mm. The consumable electrode was then polished around.

2) Before the pressurized electroslag remelting, 340 kg of the pre-melted slag consisting of, in percentages by mass, $CaF_2$ of 66%, CaO of 18%, and $Al_2O_3$ of 16%, was put into a resistance furnace, and baked at a temperature of 800° C. for 6 hours, obtaining a dried pre-melted slag.

3) The consumable electrode obtained in step 1) was welded to the dummy electrode and connected to the electrode holder of the pressurized electroslag remelting furnace. The crystallizer and bottom water-cooled base plate were checked carefully to ensure that there was no water leakage. After cleaning the bottom water-cooled base plate, the dummy plate was placed on the bottom water-cooled base plate, which was then raised. The arc striking steel cuttings made of the same material as the consumable electrode was added, and the pre-melted slag was laid around. The electrode was lowered to the required position for slagging, and the consumable electrode, the arc striking steel cuttings and the bottom water-cooled base plate were in close contact to ensure that the current flows through them after power on. The pressurized electroslag remelting furnace was sealed.

4) The pressurized electroslag remelting furnace in step 3) was vacuumed to a vacuum degree of 12.7 Pa by a vacuum pump, and then the melting chamber was charged with nitrogen with a purity of ≥99.999% to normal pressure, obtaining a treated pressurized electroslag remelting furnace.

5) The alternating current power supply was switched on, with a current of 11 kA and a voltage of 60 V; at the same time, the pre-melted slag was added to the crystallizer in batches with a stepping feeder for arc striking slagging, and then the arc slagging was performed for 45 minutes. After the arc striking slagging, the melting chamber was charged with nitrogen with a purity of ≥99.999% until the pressure reached 1.60 MPa, synchronously the pressure of the cooling water in the jacket of the crystallizer in the electroslag remelting furnace was raised to 1.60 MPa, the voltage was adjusted to 78 V and the current was adjusted to 20 kA, and then the pressurized electroslag remelting was started with a melting rate of 0.76 t/h. The melting was performed with a current fluctuation of less than ±3%, a voltage fluctuation of less than ±0.5%, and a melting rate fluctuation of less than 10%. Then the voltage was adjusted to 60 V, and the current was adjusted to 10 kA, and the feeding was started, during which the voltage was kept constant, and the current was stepwise reduced. The current was reduced by 1.0 kA for each reduction, and kept constant for 6 min after each

TABLE 5

The composition of the high nitrogen austenitic stainless steel ingot as prepared in Example 3

| Composition | C | Mn | Cr | Mo | N | S | P | Fe |
|---|---|---|---|---|---|---|---|---|
| Content | 0.03 | 18.40 | 17.92 | 2.00 | 0.91 | 0.0033 | 0.007 | balance | reduction, and when it was reduced to 1.0 kA, the current was kept constant for 30 min. After the feeding, the electrode was lifted and powered off. The alternating current power supply was switched off. After the high nitrogen austenitic stainless steel electroslag remelting ingot was solidified, the nitrogen pressure was gradually reduced in the crystallizer, and simultaneously the pressure of the cooling water in the jacket of crystallizer was reduced, then a high nitrogen austenitic stainless steel electroslag remelting ingot was obtained.

The composition of the high nitrogen austenitic stainless steel electroslag remelting ingot was shown in Table 6.

TABLE 6

Composition of high nitrogen austenitic stainless steel electroslag remelting ingot as prepared in Example 3

| Composition | C | Mn | Cr | Mo | N | S | P | Fe |
|---|---|---|---|---|---|---|---|---|
| Content | 0.03 | 18.20 | 17.90 | 1.96 | 0.90 | 0.0012 | 0.007 | balance |

It can be seen from Table 5 and Table 6 that after the pressurized electroslag remelting, the high nitrogen austenitic stainless steel electroslag remelting ingot obtained in Example 3 had significantly reduced sulfur content, and substantially unchanged contents of the other compositions.

Example 4

The melting equipment used was an 80 t pressurized ladle refining furnace and a 20 t pressurized electroslag remelting furnace, of which the pressurized ladle refining furnace has a ultimate vacuum of 8 Pa, a maximum pressure of 7 MPa, and a ladle charging amount of 75 to 80 t; the pressurized electroslag remelting furnace has a maximum pressure of 5 MPa, a crystallizer with an inner diameter D of 950 mm, and a consumable electrode with a weight of about 15 t.

According to Formula I, Formula I, Formula III and Formula IV, the gas nitriding pressure $p_1$ was calculated as 0.45 MPa, the bottom blowing pressure $p_2$ was calculated as 1.07 MPa, the casting pressure $p_3$ was calculated as 1.90 MPa, and the pressurized electroslag remelting pressure $p_4$ was calculated as 2.20 MP. Raw materials for the melting and the mass thereof were as follows: 80.16 t of a molten steel from Converter+LF, 80.11 kg of nickel-magnesium alloy (80Ni-20Mg) and 40.05 kg of cerium.

The molten steel consisted of the following composition in percentages by mass: C: 0.06%, Si: 0.52%, Mn: 14.08%, Cr: 18.71%, Mo: 3.04%, S: 0.021%, P: 0.008%, and the balance of Fe.

The high nitrogen austenitic stainless steel 18Cr14Mn3Mo0.9N consisted of the following target composition in percentages by mass: C: 0.05%, Si: 0.50%, Mn: 14.00%, Cr: 18.60%, Mo: 3.00%, N: 0.90%, S: ≤0.015%, P: ≤0.06%, and the balance of Fe.

(1) The pressurized ladle was preheated to 1150° C., and the molten steel with a temperature of 1635° C. was added to the pressurized ladle, then the pressurized ladle furnace was vacuumed to a vacuum degree of 12.8 Pa by a vacuum pump. The ladle furnace was charged with high-purity nitrogen with a purity of ≥99.999% until the gas nitriding pressure was 0.45 MPa, and at the same time, the high-purity nitrogen was blown with a pressure of 1.07 MPa and at a flow rate of 180 NL/min through the permeable bricks at the bottom of the ladle for 18 minutes for nitrogen alloying. Then the feeding valve was opened and the nickel-magnesium alloy was added into the molten steel with a feeding hopper, kept stand for 2 min and then cerium was added and kept stand for 2 min, then the blowing nitrogen was stopped. After stopping the blowing nitrogen, the ladle was charged with a high-purity nitrogen with a purity of ≥99.999% until the pressure reached 1.90 MPa, then the molten steel was cast into an ingot mold with a casting temperature of 1520° C., and the pressure was released after solidification, obtaining a high nitrogen austenitic stainless steel ingot.

The composition of the high nitrogen austenitic stainless steel ingot was shown in Table 7.

TABLE 7

The composition of the high nitrogen austenitic stainless steel ingot as prepared in Example 4

| Composition | C | Si | Mn | Cr | Mo | N | S | P | Fe |
|---|---|---|---|---|---|---|---|---|---|
| Content | 0.04 | 0.49 | 13.96 | 18.50 | 3.10 | 0.92 | 0.0026 | 0.008 | balance |

(2) The high nitrogen austenitic stainless steel ingot obtained in step (1) was subjected to a pressurized electroslag remelting, obtaining a high nitrogen steel electroslag remelting ingot.

The pressurized electroslag remelting was performed according to the following procedure:

1) The high nitrogen austenitic stainless steel ingot was kept at a temperature of 1200° C. for 3 hours, and forged into a consumable electrode with a diameter of 850 mm. The consumable electrode was then polished around.

2) Before the pressurized electroslag remelting, 346 kg of the pre-melted slag consisting of, in percentages by mass, $CaF_2$ of 60%, CaO of 20%, and $Al_2O_3$ of 20%, was put into a resistance furnace, and baked at a temperature of 800° C. for 6 hours, obtaining a dried pre-melted slag.

3) The consumable electrode obtained in step 1) was welded to the dummy electrode and connected to the electrode holder of the pressurized electroslag remelting furnace. The crystallizer and bottom water-cooled base plate were checked carefully to ensure that there was no water leakage. After cleaning the bottom water-cooled base plate, the dummy plate was placed on the bottom water-cooled base plate, which was then raised. The arc striking steel cuttings made of the same material as the consumable electrode was added, and the pre-melted slag was laid around. The electrode was lowered to the required position for slagging, and the consumable electrode, the are striking steel cuttings and the bottom water-cooled base plate were in close contact to ensure that the current flows through them after power on. The pressurized electroslag remelting furnace was sealed.

4) The pressurized electroslag remelting furnace in step 3) was vacuumed to a vacuum degree of 12.5 Pa by a vacuum pump, and then the melting chamber was charged with nitrogen with a purity of ≥99.999% to normal pressure, obtaining a treated pressurized electroslag remelting furnace.

5) The alternating current power supply was switched on, with a current of 11 kA and a voltage of 60 V; at the same time, the pre-melted slag was added to the crystallizer in batches with a stepping feeder for arc striking slagging, and then the arc slagging was performed for 45 minutes. After the arc striking slagging, the melting chamber was charged with nitrogen with a purity of ≥99.999% until the pressure reached 2.20 MPa, synchronously the pressure of the cooling water in the jacket of the crystallizer in the electroslag remelting furnace was raised to 2.20 Ma, the voltage was adjusted to 78 V and the current was adjusted to 20 kA, and then the pressurized electroslag remelting was started with a melting rate of 0.77 t/h. The melting was performed with a current fluctuation of less than 3%, a voltage fluctuation of less than 0.5%, and a melting rate fluctuation of less than 10%. Then the voltage was adjusted to 50 V, and the current was adjusted to 10 kA, and the feeding was started, during which the voltage was kept constant, and the current was stepwise reduced. The current was reduced by 1.0 kA for each reduction, and kept constant for 6 min after each reduction, and when it was reduced to 1.0 kA, the current was kept constant for 30 min. After the feeding, the electrode was lifted and powered off. The alternating current power supply was switched off. After the high nitrogen austenitic stainless steel electroslag remelting ingot was solidified, the nitrogen pressure was gradually reduced in the crystallizer, and simultaneously the pressure of the cooling water in the jacket of crystallizer was reduced, then a high nitrogen austenitic stainless steel electroslag remelting ingot was obtained.

The composition of the high nitrogen austenitic stainless steel electroslag remelting ingot was shown in Table 8.

TABLE 8

| Composition of high nitrogen austenitic stainless steel electroslag remelting ingot as prepared in Example 4 | | | | | | | | |
|---|---|---|---|---|---|---|---|---|
| Composition | C | Si | Mn | Cr | Mo | N | S | P | Fe |
| Content | 0.04 | 0.48 | 13.93 | 18.46 | 3.00 | 0.91 | 0.0009 | 0.007 | balance |

It can be seen from Table 7 and Table 8 that after the pressurized electroslag remelting, the high nitrogen austenitic stainless steel electroslag remelting ingot obtained in Example 4 had significantly reduced sulfur content, and substantially unchanged contents of the other compositions.

Figure 1:
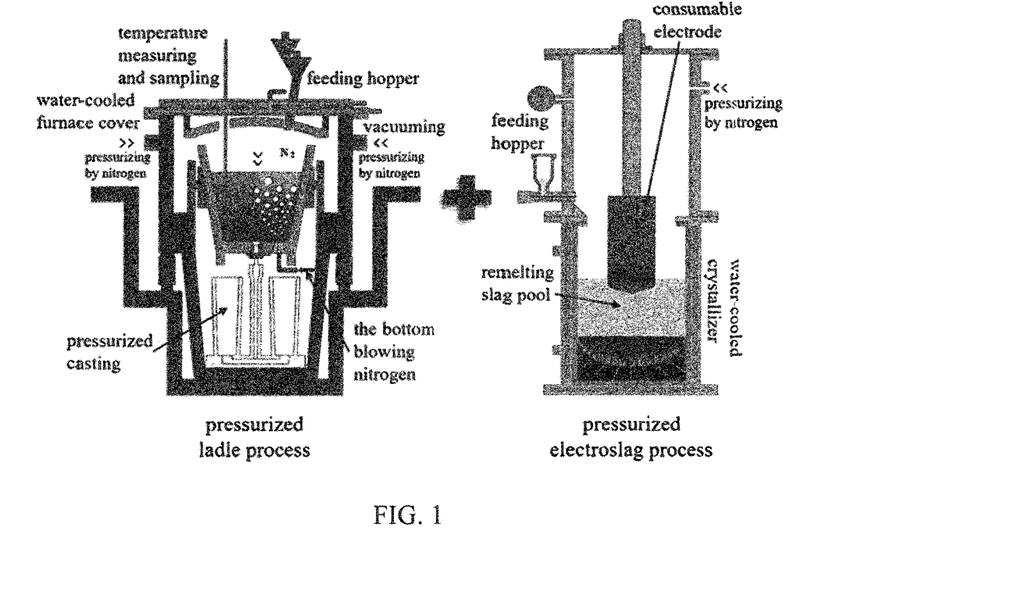
FIG. 1 shows a schematic process flow diagram of the methods according to Examples 1 to 4 of the present disclosure, with a duplex melting process of a pressurized ladle refining and a pressurized electroslag remelting.

FIG. 1 shows a schematic process flow diagram of the methods according to Examples 1 to 4 of the present disclosure, by a duplex melting process of a pressurized ladle refining and a pressurized electroslag remelting. The pressurized ladle is preheated, loaded with a molten steel, and vacuumed in sequence; nitrogen is blown from the bottom of the pressurized ladle, and at the same time, the pressurized ladle furnace is pressurized by nitrogen from the left and right places at the upper to carry out the nitrogen alloying, and then nickel-magnesium alloy and rare earth are sequentially added, to perform a deep deoxidation and deep desulfurization. After the deep deoxidation and deep desulfurization, the blowing nitrogen from the bottom is stopped, and pressure is raised to the casting pressure by the upper nitrogen to carry out the pressurized casting, and the high nitrogen steel ingot is obtained after cooling; the high nitrogen steel ingot is prepared into consumable electrodes and installed in the pressurized electroslag remelting furnace (the installation structure as shown in the right of FIG. 1), and thus subjected to the pressurized electroslag remelting, to obtain a high nitrogen stainless steel electroslag remelting ingot.

Figure 2:
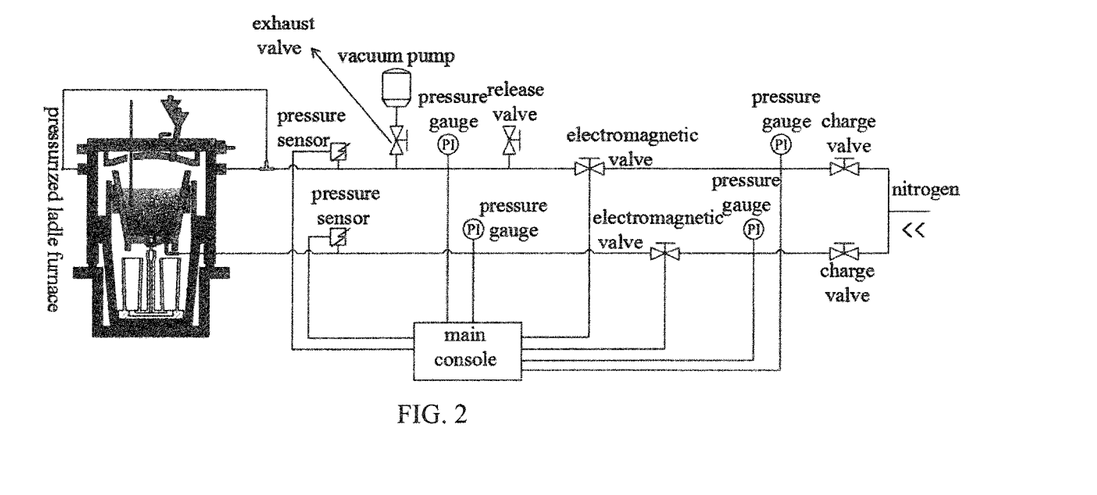
FIG. 2 shows a diagram illustrating the principle of the pressurized gas control system of the pressurized ladle furnace according to Examples 1 to 4 of the present disclosure.

FIG. 2 shows a diagram illustrating the principle of the pressurized gas control system of the pressurized ladle furnace according to Examples 1 to 4 of the present disclosure. It can be seen from FIG. 2 that the present disclosure adopts a stepwise control of nitrogen pressure during the nitrogen alloying and the casting process, a real-time monitoring of the pressure in the pressurized ladle furnace, and an online control of the nitrogen pressure during blowing nitrogen from the bottom with the gas control system.

Figure 3:
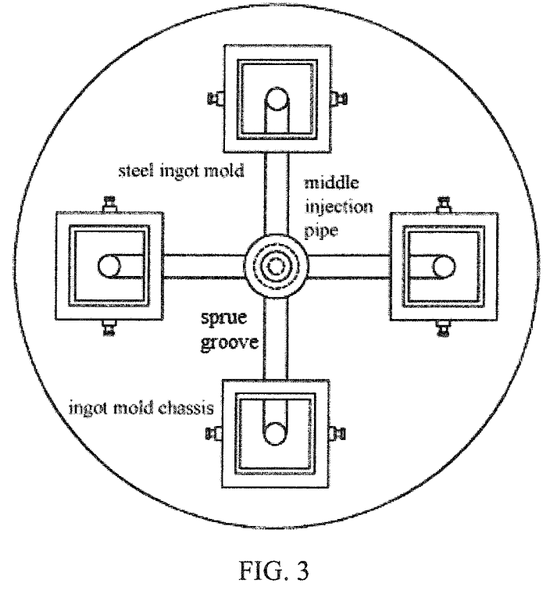
FIG. 3 shows a top view of a casting device in the pressurized ladle furnace according to Examples 1 to 4 of the present disclosure.

FIG. 3 is a top view of a casting device in the pressurized ladle furnace according to Examples 1 to 4 of the present disclosure. It can be seen from FIG. 3 that the present disclosure adopts the bottom pouring to cast four ingots at the same time, and enables a high casting efficiency, and a good surface quality in the obtained high nitrogen steel ingots, which is suitable for the large-scale industrial production of the high nitrogen steel.

The above are only the preferred embodiments of the present disclosure. It should be pointed out that for those skilled in the art, without departing from the principle of the present disclosure, several improvements and modifications can be made, and these improvements and modifications are also should be regarded as the protection scope of the present disclosure.

What is claimed is:

1. A method for producing a high nitrogen steel by a duplex melting process of pressurized ladle refining and a pressurized electroslag remelting, comprising the following steps:

(1) subjecting a molten steel to a nitrogen alloying in a pressurized ladle furnace to obtain a nitrogen-alloyed molten steel,
then subjecting the nitrogen-alloyed molten steel to a deep deoxidation to obtain a deeply deoxidized product,
subjecting the deeply deoxidized product to a deep desulfurization to obtain a deeply desulfurized product, and
finally casting the deeply desulfurized product, to obtain a high nitrogen steel ingot,
wherein the nitrogen alloying comprises blowing nitrogen from the bottom of the pressurized ladle and nitriding at the interface of gas and the molten steel under pressure; and the deep deoxidation and deep desulfurization are achieved by adding a nickel-magnesium alloy and rare earth to the nitrogen-alloyed molten steel; and (2) subjecting the high nitrogen steel ingot obtained in step (1) to a pressurized electroslag remelting, to obtain a high nitrogen steel electroslag remelting ingot;

wherein a gas nitriding pressure $p_1$ during the nitriding at the interface of gas and the molten steel in step (1) is calculated according to Formula I:

$$\lg[\%N] = \frac{1}{2}\lg(p_1/p^\theta) - \frac{188}{T} - 1.17 - \left\{\left(\frac{3280}{T} - 0.75\right)(0.13[\%N] + 0.118[\%C] + 0.043[\%Si] + 0.011[\%Ni] + 3.5 \times 10^{-5}[\%Ni]^2 - 0.024[\%Mn] + 3.2 \times 10^{-5}[\%Mn]^2 - 0.01[\%Mo] + 7.9 \times 10^{-5}[\%Mo]^2 - 0.048[\%Cr] + 3.5 \times 10^{-4}[\%Cr]^2) - 0.098[\%V] + 0.061 g\sqrt{p_1/p^\theta}\right\},$$ Formula I in which $p_1$ represents the gas nitriding pressure in MPa; $p^\theta$ represents a standard atmospheric pressure, which is 0.101325 MPa; and T represents a melting temperature in K;

wherein a bottom blowing pressure $p_2$ during blowing nitrogen from the bottom of the pressurized ladle in step (1) is calculated according to Formula II:

$$p_2 = 1.1(p_1 + \rho_{steel} gh + p_{loss})$$ Formula II, in which $p_2$ represents the bottom blowing pressure in MPa; $p_1$ represents the gas nitriding pressure in MPa; $\rho_{steel}$ represents a density of the molten steel in kg/m$^3$; g represents gravitational acceleration, which is 9.8 m/s$^2$; h represents a depth of the molten steel in the ladle, in m; and $p_{loss}$ represents a pressure loss in pipelines and permeable bricks, which is in a range of 0.30 MPa to 0.50 MPa;

wherein the high nitrogen steel is a high nitrogen stainless steel, and the high nitrogen stainless steel is a high nitrogen austenitic stainless steel or a high nitrogen martensitic stainless steel;

under the condition that the high nitrogen steel is the high nitrogen austenitic stainless steel, a casting pressure $p_3$ in step (1) is calculated according to Formula III:

$$p_3 = [(0.30 \text{ to } 0.40)p_1/p^\theta + (0.50 \text{ to } 0.60)]$$ Formula III, in which $p_3$ represents the casting pressure in MPa; $p^\theta$ represents the standard atmospheric pressure in MPa; and a remelting pressure $p_4$ for the pressurized electroslag remelting in step (2) is calculated according to Formula IV:

$$p_4 = [p_3 + (0.30 \text{ to } 0.40)]$$ Formula IV, in which $p_4$ represents the remelting pressure in MPa; and under the condition that the high nitrogen steel is the high nitrogen martensitic stainless steel, a casting pressure $p_5$ in step (1) is calculated according to Formula V:

$$p_5 = [(0.15 \text{ to } 0.20)p_1/p^\theta + (0.45 \text{ to } 0.60)]$$ Formula V;

in which $p_5$ represents the casting pressure in MPa; $p^\theta$ represents the standard atmospheric pressure in MPa; and a remelting pressure $p_6$ for the pressurized electroslag remelting in step (2) is calculated according to Formula VI:

$$p_6 = [p_5 + (0.30 \text{ to } 0.40)]$$ Formula VI, in which $p_6$ represents the remelting pressure in MPa.

2. The method as claimed in claim 1, further comprising in sequence preheating the pressurized ladle, pouring the molten steel into the preheated pressurized ladle and vacuuming, before the nitrogen alloying in step (1), wherein the preheating is performed so that a temperature of the pressurized ladle of 1100° C. to 1200° C. is reached, and the vacuuming is performed so that a vacuum degree of less than 15 Pa is reached.

3. The method as claimed in claim 1, wherein the molten steel in step (1) is produced by a process of AOD+LF, VOD+LF or Converter+LF, with a temperature of 1620° C. to 1650° C., and the method further comprises subjecting the molten salt in step (1) to a pre-deoxidation and pre-desulfurization before step (1).

4. The method as claimed in claim 1, wherein under the condition that the high nitrogen steel is a high nitrogen austenitic stainless steel, the high nitrogen austenitic stainless steel comprises the following compositions in percentages by mass: C: 0.02-0.1%, Mn: 5-30%, Cr: 18-30%, Si: ≤1%, Mo: 0-6.0%, N: 0.2-1.2%, Ni: 0-25%, V: 0-1%, S: ≤0.015%, P: ≤0.05%, and the balance of Fe.

5. The method as claimed in claim 1, wherein under the condition that the high nitrogen steel is a high nitrogen martensitic stainless steel, the high nitrogen martensitic stainless steel comprises the following compositions in percentages by mass: C: 0.1-1.0%, Mn: 0.1-1%, Cr: 12-20%, Si: ≤1%, Mo: 0-3.0%, N: 0.1-0.6%, Ni: 0-4.5%, V: 0-2%, S: ≤0.015%, P: ≤0.05%, and the balance of Fe.

\* \* \* \* \*